United States Patent
Boutinon et al.

(10) Patent No.: US 10,634,936 B2
(45) Date of Patent: Apr. 28, 2020

(54) LENS OF VARIABLE OPTICAL POWER, OPTICAL ASSEMBLY COMPRISING SUCH A LENS AND VISION-CORRECTING DEVICE COMPRISING SUCH AN OPTICAL ASSEMBLY

(71) Applicant: ESSILOR INTERNATIONAL, Charenton-le-Pont (FR)

(72) Inventors: Stephane Boutinon, Charenton le Pont (FR); Michel Nauche, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/747,804

(22) PCT Filed: Aug. 4, 2016

(86) PCT No.: PCT/FR2016/052032
§ 371 (c)(1),
(2) Date: Jan. 26, 2018

(87) PCT Pub. No.: WO2017/021663
PCT Pub. Date: Feb. 9, 2017

(65) Prior Publication Data
US 2018/0210232 A1    Jul. 26, 2018

(30) Foreign Application Priority Data
Aug. 4, 2015   (FR) ..................................... 15 57532

(51) Int. Cl.
*G02C 7/08*    (2006.01)
*G02B 3/14*    (2006.01)
(Continued)

(52) U.S. Cl.
CPC ............... *G02C 7/085* (2013.01); *G02B 3/14* (2013.01); *G02B 26/004* (2013.01); *G02B 3/06* (2013.01)

(58) Field of Classification Search
CPC .......... G02C 7/08; G02C 7/083; G02C 7/085; G02C 7/101; G02C 2202/22; G02B 3/12;
(Continued)

(56) References Cited

U.S. PATENT DOCUMENTS 4,890,903 A * 1/1990 Treisman ................. G02B 3/14
359/666
5,229,885 A * 7/1993 Quaglia .................. G01S 13/18
351/158

(Continued)

FOREIGN PATENT DOCUMENTS

DE    37 12 145 A1    3/1988
EP    0 291 596 A1    11/1988
(Continued)

OTHER PUBLICATIONS

Randall Mark et al: "Adjustable adaptive compact fluidic phoropter with no mechanical translation of lenses", NIH Public Access, Author Manuscript, Published in final edited form as: Opt Lett. Mar. 1, 2010; 35(5): 739-741, College of Optical Sciences, Department of Ophthalmology and Vision Science.
(Continued)

*Primary Examiner* — Jie Lei
(74) *Attorney, Agent, or Firm* — Young & Thompson

(57) ABSTRACT

Disclosed is a lens of variable optical power, characterized in that it includes: a transparent flexible lamella; a body having a ridge inscribed in a cylindrical surface; an element able to move a first portion of the lamella, which is distinct from a second portion of the lamella making contact with the ridge, so as to deform the lamella by flection; and a liquid
(Continued)

contained between the lamella and the body. An optical assembly including such a lens and a vision-correcting device including such an optical assembly are also proposed.

21 Claims, 1 Drawing Sheet

(51) Int. Cl.
*G02B 26/00* (2006.01)
*G02B 3/06* (2006.01)

(58) Field of Classification Search
CPC . G02B 3/14; G02B 1/041; G02B 3/06; G02B 7/023; G02B 26/004; G02B 26/005; A61B 3/0285; A61B 3/036; A61B 3/04; A61B 3/028; A61B 3/08
USPC ............... 359/665–667, 557, 694, 808, 813, 359/822–824; 351/159.01, 159.41, 351/159.11, 159.34, 159.35, 159.68, 351/159.73, 168, 172, 176, 178
See application file for complete search history.

(56) References Cited

U.S. PATENT DOCUMENTS

| | | | |
|---|---|---|---|
| 8,000,022 B2 | 8/2011 | Niederer | |
| 8,064,142 B2* | 11/2011 | Batchko | G02B 3/14 359/665 |
| 9,980,639 B2* | 5/2018 | Nauche | A61B 3/0285 |

FOREIGN PATENT DOCUMENTS

| | | |
|---|---|---|
| EP | 2 034 338 A1 | 3/2009 |
| WO | 2015/107303 A1 | 7/2015 |

OTHER PUBLICATIONS

International Search Report, dated Oct. 31, 2016, from corresponding PCT/FR2016/052032 application.

* cited by examiner

LENS OF VARIABLE OPTICAL POWER, OPTICAL ASSEMBLY COMPRISING SUCH A LENS AND VISION-CORRECTING DEVICE COMPRISING SUCH AN OPTICAL ASSEMBLY

TECHNICAL FIELD OF THE INVENTION

The present invention relates to the field of optics.

It more particularly relates to a lens of variable optical power, to an optical assembly comprising such a lens and to a vision-correcting device comprising such an optical assembly.

TECHNOLOGICAL BACKGROUND

A lens of variable power comprising a chamber partially bounded by an elastic membrane and filled with a fluid is for example known from document EP 2 034 338.

It is proposed in this document to make the volume of the chamber vary (by moving mechanical elements) in order to modify the pressure of the fluid and thus deform the membrane.

This solution is thus based on an elastic deformation of the membrane via stretching, which allows a spherical shape to be given thereto, and it is therefore very suitable when it is desired to make the spherical power of the lens along a given optical axis vary.

The obtainment of an astigmatism is in contrast more complex in such a system since it for example requires the use of a membrane made of a non-uniform and/or anisotropic material.

SUBJECT OF THE INVENTION

In this context, the present invention provides a lens of variable optical power, characterized in that it comprises: a flexible transparent plate; a body having a ridge inscribed in a cylindrical surface; an element able to move a first portion of the plate, distinct from a second portion of the plate making contact with the ridge, so as to deform the plate by bending; and a liquid contained between the plate and the body.

By moving said element, it is thus possible to deform the flexible plate (by unidirectional bending) so that it closely follows, to a greater or lesser extent, the shape of the ridge, this allowing the dioptric characteristics of the lens to be modified and the desired variation in cylindrical optical power to be obtained by virtue of the cylindrical shape of the ridge.

According to optional and therefore nonlimiting features:
the element is a control part that is guided translationally in the body and arranged to bear against said first portion of the plate so as to press said second portion of the plate against the ridge;
a control ring rotatably mounted in the body interacts with the control part by means of a bolt/nut system;
the plate is received in the interior of a central opening of the body and comprises means preventing its rotation about an axis passing through the central opening (which for example corresponds to the optical axis of the lens);
the ridge is formed by an end edge of a wall encircling the central opening;
the liquid is received between the plate and the body with an insufficient pressure to cause (due to the pressure alone) a deformation (by stretching) of the plate;
the liquid is held in a chamber formed by the plate and by a peripheral elastic membrane.

The invention also provides an optical assembly comprising a first lens such as mentioned above and a second lens the spherical power along an optical axis of which is variable.

According to optional and therefore nonlimiting features:
the spherical power is varied by moving a mechanical element of the second lens;
the body of the first lens is mounted so as to be rotatable about the optical axis;
a first driving system is designed to move the element of the first lens, a second driving system is designed to move the mechanical element of the second lens and a third driving system is designed to drive the body to rotate about the optical axis;
the third driving system is designed to move the optical assembly jointly with the body in rotation about the optical axis;
the third driving system is designed to drive the body independently of the element of the first lens and of the mechanical element of the second lens;
a means for controlling the first driving system and the second driving system is designed to pilot the first driving system so as to preserve a given relative position between the body and the element of the first lens, and to pilot the second driving system so as to preserve a given relative position between the body and the mechanical element of the second lens.

Lastly, the invention provides a vision-correcting device comprising an optical assembly such as just defined.

DETAILED DESCRIPTION OF AN EXEMPLARY EMBODIMENT

The description which follows with reference to the appended drawings, which are given by way of nonlimiting examples, will make it easy to understand what the invention consists of and how it can be achieved.

In the appended drawings:

FIGS. 1 to 3 show an optical assembly comprising a first lens 100 and a second lens 200.

Figure 1:
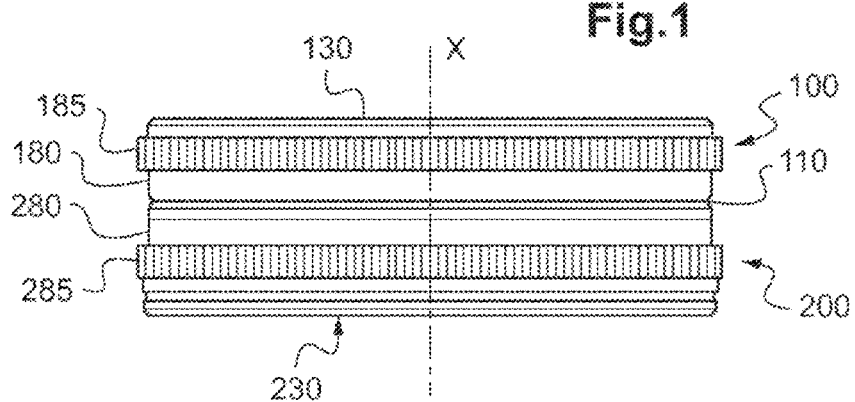
FIG. 1 shows an optical assembly comprising a lens according to the invention.

The first lens 100 and the second lens 200 are here respectively located on either side of one and the same frame (or body) 110. A (transparent) undeformable separating platen 118, which is mounted on the common frame 110, defines the liquid-filled chambers of the first lens 100 and the second lens 200, as explained below, and thus allows the two lenses 100, 200 to operate independently.

As a variant, either one of the two lenses 100, 200 could be separate. Below, each lens 100, 200 is described separately.

As explained below, the first lens 100 is designed to generate, along an optical axis X of the first lens, a variable cylindrical optical power.

The second lens 200 is for its part designed to generate, along its optical axis, which is identical to the optical axis X of the first lens 100, a variable spherical optical power.

The first lens 100 comprises the frame (or body) 110 and a flexible transparent plate 150.

The frame 110 has a central opening 120 that is closed at one end by a first (transparent) closing plate 130 and at the other end by the separating platen 118; the flexible transparent plate 150 is located in the central opening 120, between the first closing plate 130 and the separating platen 118.

Two walls integrated into the frame 110 allow the flexible plate 150 to be guided in such a way as to prevent any rotation of the flexible plate 150 around the optical axis X.

The frame 110 has a ridge 115 that lies on the periphery of the central opening 120 and that is inscribed in a cylindrical surface the axis of which is perpendicular and secant to the optical axis X.

The frame 110 for example comprises to this end a wall 112 that encircles the central opening 120 and the free end edge of which defines the aforementioned ridge 115.

The function of the ridge 115 is to create a stop that serves as a starting point for the curvature of the flexible plate 150 (by bending), as explained below. The cylindrical shape of the ridge 150 (i.e. the cylindrical surface in which the ridge 115 is inscribed) thus has a radius smaller than the radius corresponding to the maximum desired cylindrical power—typically about 40 mm or less.

The first lens 100 also comprises a first control part 160 that is securely fastened to the flexible plate 150.

More precisely, the first control part 160 is securely fastened to a peripheral portion of the flexible plate 150.

The first control part 160 here takes the form of an annular control platen encircling the central opening 120 and including, level with each of two zones that are 180° opposite, an external thread.

The first control part 160 is mounted in the frame 110 so as to be guided translationally along the optical axis X. This first control part 160 is thus mounted so as to be translationally movable along the optical axis X, perpendicularly to the axis of said cylindrical surface.

The first lens 100 also comprises a first elastic membrane 170 of cylindrical shape and connecting the frame 110 and the first control part 160.

The flexible plate 150, the first control part 160, the first elastic membrane 170, the intermediate platen 118 and the frame 110 form a chamber filled with a liquid 190. Here, this liquid 190 is identical to that used in document U.S. Pat. No. 8,000,022, namely silicone oil (for example of the Rhodrosil oil 47 type).

The frame 110 includes apertures 195 for passage of fluid in the aforementioned wall 112 in order to facilitate the passage of the liquid between the various portions of the chamber.

The first elastic membrane 170 is designed to deform (by stretching in particular) in order to compensate for variations in the volume of the chamber filled with the liquid 190 caused by the bending of the flexible plate 150, as described below. As is clearly shown in FIGS. 2 and 3, the first elastic membrane 170 is located on the periphery of the frame 110 and therefore plays no optical role.

The cylindrical first lens 100 lastly comprises a first control ring 180, which may be moved only rotationally through a given angle around the optical axis X. The first control ring 180 includes an internal thread (here of square cross section) centered on the optical axis X and that engages with the external thread of the first control part 160.

The first control ring 180 also has a plurality of teeth 185 right round its periphery so as to form a toothed wheel and to thus be able to be driven to rotate by a first driving system (not shown), for example a motor the output axle of which comprises a worm screw that interacts with the teeth 185 of the first control ring 180.

Provision may moreover be made to limit the travel of the first control ring 180, for example by means of a hard stop formed between the frame 110 and the first control ring 180.

The motions that allow the flexible plate 150 to be bent and thus a variable cylindrical optical power to be obtained will now be described.

Figure 2:
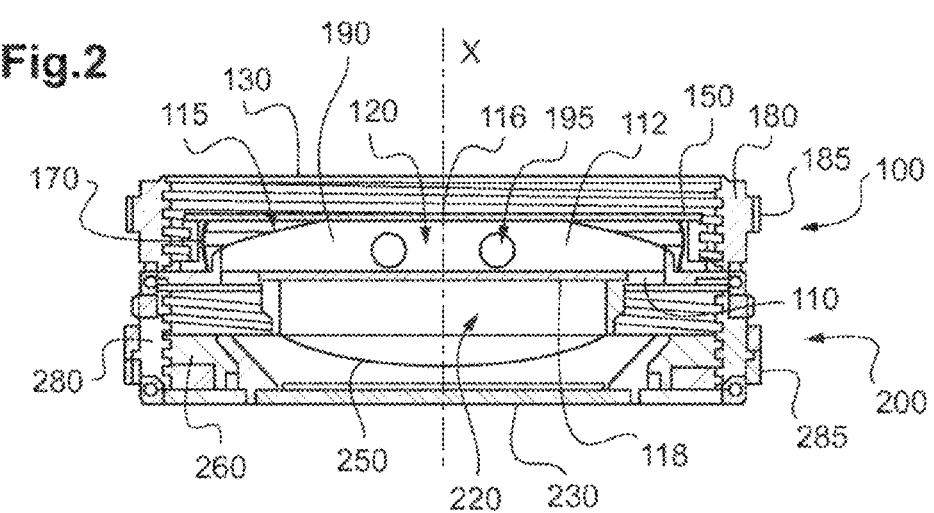
FIG. 2 shows a cross-sectional view of the optical assembly in FIG. 1.
Figure 3:
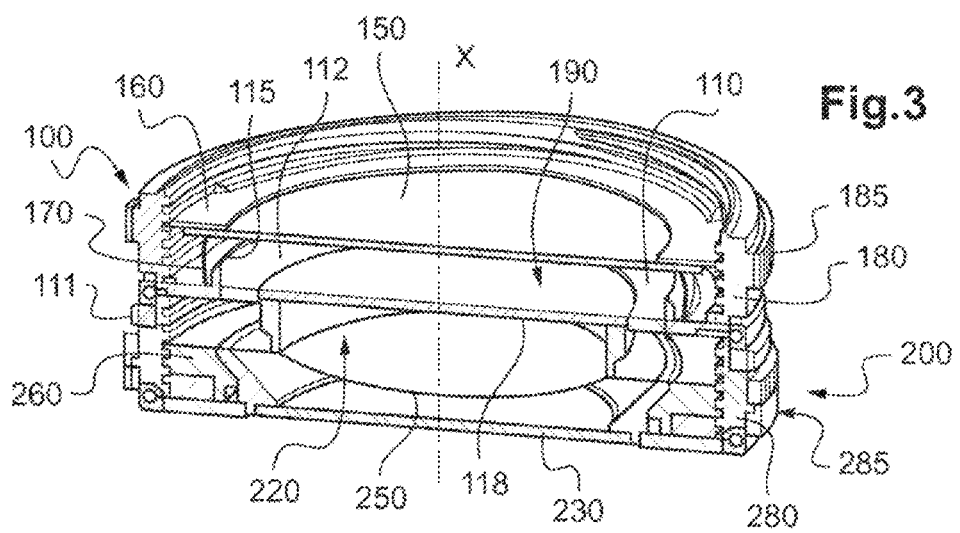
FIG. 3 shows a perspective cut-away view of the optical assembly of FIG. 1.

Below, the first control part 160 is considered to be in its highest position (considering the orientation in FIG. 2) i.e. the closest to the first closing plate 130, as shown in FIGS. 2 and 3. As may be seen in these figures, in this position of the first control part 160, the flexible plate 150 does not make contact with the ridge 115.

When the first control ring 180 is rotated (for example by means of the aforementioned first driving system), the first control part 160 begins to be translated (downward in FIG. 2) by way of the bolt/nut system, through a few degrees, until the flexible plate 150 makes contact with the cylindrical ridge 115 that is securely fastened to the frame 110 (this contact occurring first at the top 116 of the ridge 115 in FIG. 2, i.e. in the plane containing the optical axis X and the axis of the cylindrical surface containing the ridge 115).

Specifically, the first control part 160 moves said peripheral portion of the flexible plate 150 whereas another portion of this flexible plate 150 makes contact with the ridge 115.

By continuing the rotation of the first control ring 180, the assembly formed from the first control part 160 and the flexible plate 150 continues its translation (downward in FIG. 2, i.e. away from the first closing plate 130) so that the flexible plate 150 begins to gradually bend, with a (bend) radius value directly related to the angle of rotation of the first control ring 180.

By virtue of the ridge of cylindrical shape, the flexible plate 150 will preferentially deform to a cylindrical shape, this allowing the sought-after cylindrical correction to be obtained, which has a variable power depending on the value of the aforementioned bending radius.

Moreover, due to the fact that the deformation of the flexible plate is initiated by the ridge 150 inscribed in a cylindrical surface, the axis of this cylindrical correction corresponds to the axis of this cylindrical surface (i.e. to an axis that is fixed with respect to the frame 110 and perpendicular to the optical axis X).

It will be noted that the flexible plate 150 in general also undergoes a second deformation of greater or lesser size depending on its anisotropy, its bending stiffness and on the pressure increase associated with the deformation of the first elastic membrane 170. Thus, the flexible plate 150 in general does not have a purely cylindrical shape, but a toric shape.

The additional spherical component will then possibly optionally be compensated for by other optical means, here via action on the second lens 200 described below.

During the deformation of the flexible plate 150, the volume within the chamber filled with being liquid 190 remains constant. Specifically, the pressure increase generated by the deformation of the flexible plate 150 causes the first elastic membrane 170 to deform so as to absorb the transfer of liquid 190 originating from the useful zone.

It will moreover be noted that this slight pressure (applied by the flexible plate 150) allows the motion to be made reversible, while ensuring play is removed from the bolt/nut system.

In summary, by driving the first control ring 180 to rotate by means of the first driving system, the cylindrical power of the first lens 100 is made to vary as explained above (the axis of the cylindrical correction in contrast being fixed with respect to the frame 110 as explained above).

The second lens 200 comprises a holder having a central opening 220, a second elastic membrane 250 received in the central opening 220, a second control part 260 that is securely fastened to the second elastic membrane 250, and a second control ring 280.

The holder of the second lens 200 is here securely fastened to the frame 110 of the first lens 110 and for example forms a single part therewith.

The second control part 260 is mounted so as to be guided translationally in the holder, here by means of three guiding columns.

The second control ring 280 may be moved only rotationally about the optical axis X and allows, during its rotational motions, the second control part 260 to be moved translationally along the optical axis X by means of a bolt/nut system (for example formed by an internal thread of the second control ring 280 that interacts with an external thread of the second control part 260).

The second elastic membrane 250, the second control part 260, the separating platen 118 and the holder (here the common frame 110) form a liquid-filled chamber such that the translational motion of the second control part 260 causes an elastic deformation (with stretching) of the second elastic membrane 250, which thus adopts an essentially spherical shape, with a radius of curvature dependent on the position of the second control part 260.

Thus the sought-after variable spherical power is obtained.

The second control ring 280 right round its periphery has a plurality of teeth 285 so as to form a toothed wheel and to thus be able to be driven to rotate by a second driving system (not shown), for example a motor the output axle of which comprises a worm screw that interacts with the teeth 285 of the second control ring 280.

Thus, by driving the second control ring 280 to rotate by means of the second driving system, the spherical power of the second lens 200 is made to vary as explained above.

The entirety of the movement is without structural play. By virtue of this feature, it is possible to establish a control law for the movement that is continuous. Specifically, in the contrary case, since the direction of the forces exerted on the movement invert when the membrane passes from a convex shape to a concave shape, any structural play would risk throwing off the control law or complicating the definition of this control law.

As described above, it is possible to make the cylindrical power and spherical power of the correction obtained with the optical assembly formed from the first lens 100 and the second lens 200 vary by driving the first control ring 180 (for example by means of a first driving system) and the second control ring 280 (for example by means of a second driving system), respectively, to rotate.

In order to make the cylinder axis of the cylindrical correction obtained with the first lens 100 vary, the aforementioned optical assembly may be mounted so as to be able to rotate about the optical axis X with respect to a fixed frame of reference (in particular with respect to the eye of the patient in front of whom the optical assembly is placed in the context of an examination of subjective refraction).

Provision is then for example made for a third driving system designed to drive the frame 110 to rotate about the optical axis X (with respect to the aforementioned fixed frame of reference), for example by means of a set of teeth 111 provided on the external wall of the frame 110, on the periphery of the optical assembly.

According to this embodiment, the first driving system, the second driving system and the third driving system are mounted in the fixed frame of reference and the rotation of the frame 110 (achieved with the third driving system) with respect to the fixed frame of reference causes the frame to rotate on the one hand with respect to the first control ring 180 and on the other hand with respect to the second control ring 280 (these two control rings 180, 280 being immobile in the fixed frame of reference when not driven by the first and second driving systems).

In this case, provision is made to control (optionally simultaneously to the rotation of the frame 110) the first driving system and the second driving system so as to preserve the relative position of the frame 110, of the first control ring 180 and of the second control ring 280 in order to preserve the desired values of cylindrical power and spherical power.

Such a construction has the advantage of not requiring the first driving system and the second driving system to be placed in a frame of reference rigidly attached to the frame 110 and driven by the third driving system. The latter possibility is however also envisionable, in which case the third driving system is designed to rotate the optical assembly (in particular the first lens 100 and the second lens 200) jointly with the body around the optical axis.

The optical assembly that has just been described may be used in a vision-correcting device usable for example for an examination of subjective refraction.

Such a vision-correcting device comprises the optical assembly formed from the first lens 100 and second lens 200, the aforementioned first driving system (placed so as to drive the first control ring 180 to rotate), the aforementioned second driving system (placed so as to drive the second control ring 280 to rotate) and the aforementioned third driving system (designed to drive the frame 110 to rotate).

The optical axis X of the optical assembly then corresponds to an axis of observation along which a person undergoing the examination of subjective refraction may look through the vision-correcting device.

The invention claimed is:

1. A lens of variable optical power, comprising:
 a flexible transparent plate having a peripheral portion and another portion distinct from the peripheral portion;
 a body having a ridge inscribed in a cylindrical surface;
 an element configured to move said peripheral portion between a first position where the plate does not make contact with the ridge, and a second position where said another portion makes contact with the ridge thereby deforming the plate by bending; and
 a liquid contained between the plate and the body.

2. The lens as claimed in claim 1, wherein the element is a control part that is guided translationally in the body and arranged to bear against said peripheral portion of the plate so as to press said another portion of the plate against the ridge.

3. The lens as claimed in claim 2, wherein a control ring rotatably mounted in the body interacts with the control part by means of a bolt/nut system.

4. The lens as claimed in claim 3, wherein the plate is received in the interior of a central opening of the body and comprises means preventing its rotation about an axis passing through the central opening.

5. The lens as claimed in claim 3, wherein the liquid is received between the plate and the body with an insufficient pressure to cause a deformation of the plate.

6. The lens as claimed in claim 2, wherein the plate is received in the interior of a central opening of the body and comprises means preventing its rotation about an axis passing through the central opening.

7. The lens as claimed in claim 2, wherein the liquid is received between the plate and the body with an insufficient pressure to cause a deformation of the plate.

8. The lens as claimed in claim 1, wherein the plate is received in the interior of a central opening of the body and comprises means preventing its rotation about an axis passing through the central opening.

9. The lens as claimed in claim 8, wherein the ridge is formed by an end edge of a wall encircling the central opening.

10. The lens as claimed in claim 8, wherein the plate is received in the interior of a central opening of the body and comprises means preventing its rotation about an axis passing through the central opening.

11. The lens as claimed in claim 8, wherein the liquid is received between the plate and the body with an insufficient pressure to cause a deformation of the plate.

12. The lens as claimed in claim 1, wherein the liquid is received between the plate and the body with an insufficient pressure to cause a deformation of the plate.

13. The lens as claimed in claim 1, wherein the liquid is held in a chamber formed by the plate and by an elastic membrane.

14. An optical assembly comprising a first lens as claimed in claim 1, and a second lens the spherical power along an optical axis of which is variable.

15. The optical assembly as claimed in claim 14, wherein said spherical power is varied by moving a mechanical element of the second lens.

16. The optical assembly as claimed in claim 14, wherein the body of the first lens is mounted so as to be rotatable about the optical axis.

17. The optical assembly as claimed in claim 16, wherein said spherical power is varied by moving a mechanical element of the second lens, wherein a first driving system is designed to move the element of the first lens, wherein a second driving system is designed to move the mechanical element of the second lens and wherein a third driving system is designed to drive the body to rotate about the optical axis.

18. The optical assembly as claimed in claim 17, wherein the third driving system is designed to move the optical assembly jointly with the body in rotation about the optical axis.

19. The optical assembly as claimed in claim 17, wherein the third driving system is designed to drive the body independently of the element of the first lens and of the mechanical element of the second lens and wherein a means for controlling the first driving system and the second driving system is designed to pilot the first driving system so as to preserve a given relative position between the body and the element of the first lens, and to pilot the second driving system so as to preserve a given relative position between the body and the mechanical element of the second lens.

20. A vision-correcting device comprising an optical assembly as claimed in claim 17.

21. A lens having a variable optical power along an optical axis, the lens comprising:
   a flexible transparent plate having a peripheral portion and another portion distinct from the peripheral portion;
   a body having a ridge inscribed in a cylindrical surface;
   an element configured to move said peripheral portion between a first position where the plate does not make contact with the ridge, and a second position where said another portion makes contact with the ridge thereby deforming the plate by bending; and
   a liquid contained between the plate and the body,
   wherein said cylindrical surface is defined around an axis which is perpendicular to an optical axis of said lens.

\* \* \* \* \*